United States Patent
Islam et al.

(10) Patent No.: US 7,701,872 B2
(45) Date of Patent: Apr. 20, 2010

(54) METHOD AND APPARATUS FOR PACKET DATA SERVICE DISCOVERY

(75) Inventors: Khaledul M. Islam, Kanata (CA); Asif Hossain, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 1053 days.

(21) Appl. No.: 10/533,957

(22) PCT Filed: Jun. 23, 2003

(86) PCT No.: PCT/CA03/00955

§ 371 (c)(1),
(2), (4) Date: May 4, 2005

(87) PCT Pub. No.: WO2004/043098

PCT Pub. Date: May 21, 2004

(65) Prior Publication Data

US 2006/0104211 A1    May 18, 2006

Related U.S. Application Data

(60) Provisional application No. 60/423,355, filed on Nov. 4, 2002.

(51) Int. Cl.
*H04L 12/28* (2006.01)
*H04W 4/00* (2009.01)

(52) U.S. Cl. .............. 370/254; 370/328; 455/432.3

(58) Field of Classification Search ...... 455/432.1–439, 455/406–411
See application file for complete search history.

(56) References Cited

U.S. PATENT DOCUMENTS

| | | | | |
|---|---|---|---|---|
| 5,642,398 | A * | 6/1997 | Tiedemann et al. ....... | 455/426.1 |
| 6,122,503 | A * | 9/2000 | Daly ........................ | 455/419 |
| 6,549,770 | B1 * | 4/2003 | Marran ..................... | 455/419 |
| 6,621,795 | B1 | 9/2003 | Redi et al. | |
| 2002/0046285 | A1 * | 4/2002 | Yasushi et al. ............. | 709/228 |
| 2002/0065067 | A1 * | 5/2002 | Khare et al. ............... | 455/414 |
| 2002/0187775 | A1 * | 12/2002 | Corrigan et al. ........... | 455/414 |
| 2003/0129979 | A1 * | 7/2003 | Cooper ..................... | 455/432 |
| 2007/0014259 | A1 * | 1/2007 | Fajardo et al. ............. | 370/331 |
| 2008/0220740 | A1 * | 9/2008 | Shatzkamer et al. ....... | 455/411 |
| 2009/0074008 | A1 * | 3/2009 | Sargent et al. ............. | 370/469 |

FOREIGN PATENT DOCUMENTS

| | | |
|---|---|---|
| JP | 9-502064 | 2/1997 |
| JP | 2001-8251 | 1/2001 |
| WO | 2007148911 | 12/2007 |

* cited by examiner

*Primary Examiner*—Gregory B Sefcheck
(74) *Attorney, Agent, or Firm*—Curtis B. Behmann; Borden Ladner Gervais LLP

(57) ABSTRACT

A method and apparatus for packet data service discovery are described. A current blacklist comprising entries for wireless networks not providing packet data services (i.e. either not supporting the services or not having a packet data services roaming agreement) is kept in memory of the mobile device based on previous attempts to connect to such networks. Current preferred roaming lists identify whether a given wireless network can be acquired, but do not identify whether a data services roaming agreement exists. At least one of the following advantages is provided: no advance knowledge of data services roaming agreements is required; no mobile device software change is required when the data services roaming agreement changes; mobile device can notify a server of a wireless network status change; significant power savings at the mobile device; and avoid unnecessary network access, which in turn saves network resources and capacity.

16 Claims, 8 Drawing Sheets

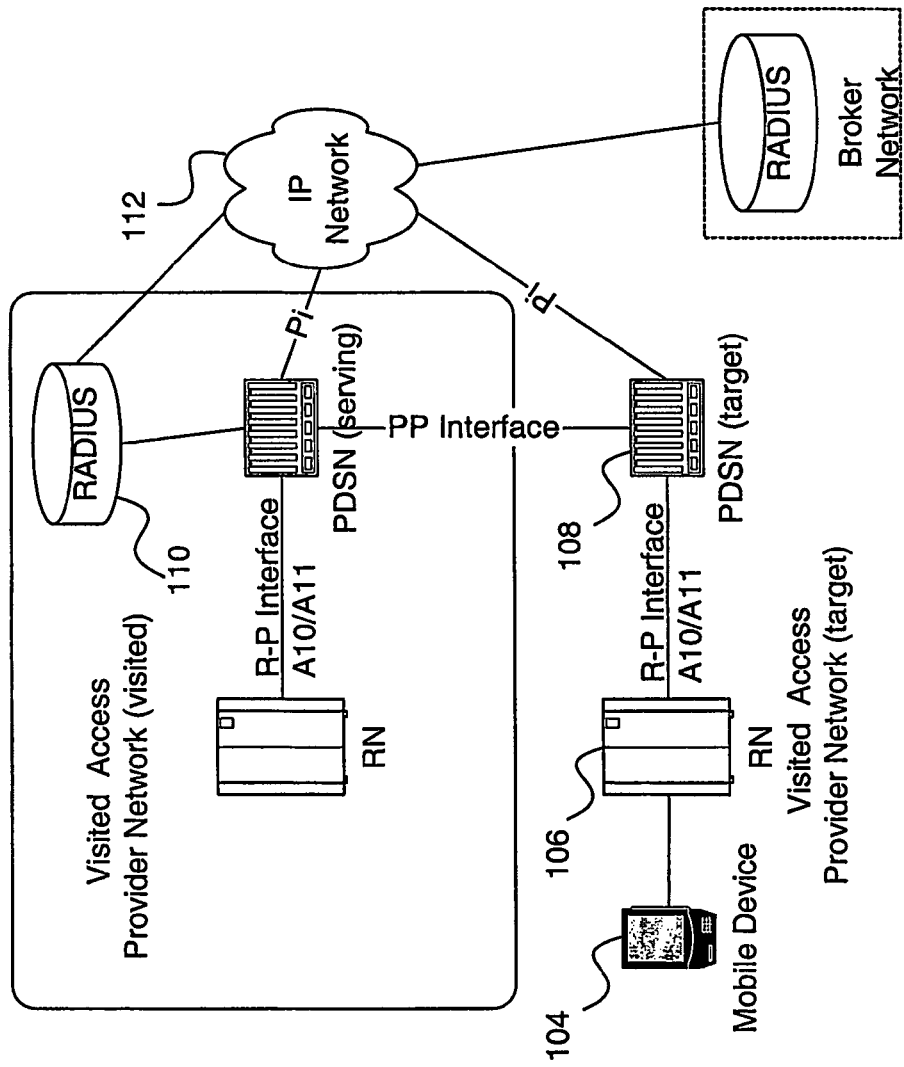

METHOD AND APPARATUS FOR PACKET DATA SERVICE DISCOVERY

This application claims the benefit of priority from U.S. Provisional Patent Application Ser. No. 60/423,355 filed on Nov. 4, 2002.

FIELD OF THE INVENTION

The present invention relates to the discovery of services provided for a mobile device in a wireless network without any a priori knowledge. The invention relates particularly to the discovery of packet data services provided for mobile devices.

BACKGROUND OF THE INVENTION

In a CDMA (Code Division Multiple Access) network, a system identifier (SID) identifies a service provider as well as a given geographical area. Networks within a system are given a network identifier or ND. A network is uniquely identified by the pair (SID, NID). FIG. 1 illustrates a network cloud 100 showing the relationship between various system identifiers and network identifiers.

A CDMA mobile device is typically pre-programmed by operators with an entity called a Preferred Roaming List (PRL). A PRL can also be downloaded to the mobile device using known over the air provisioning methods. FIG. 2 illustrates a simplified representation of a conventional preferred roaming list 102. The PRL, which comprises of a number of records, indicates which systems the mobile device is allowed to acquire. In this example, each record identifies a system by its (SID, NID) pair and provides the frequencies that the mobile device is to use when attempting to acquire the system. For each record, there can be an indicator of whether the system is preferred, the roaming status, the relative priority of the system, and its geographic region. As part of system acquisition, the mobile device searches for a CDMA Pilot Channel on a set of frequencies based on the PRL. The (SID/NID) information of the acquired system is conveyed to the mobile device on a Sync Channel once the mobile device has acquired the Pilot Channel. The PRL only contains the information about which systems the mobile device is allowed to acquire. It does not have any information about the type of services that are allowed on a given network. Typically, it only indicates that a certain degree of voice service is available on a network.

An "always-on always connected" mobile device needs to maintain data connectivity all the time to support seamless mobility. This requires the mobile device to reestablish its data connectivity whenever it changes systems. However, the mobile device has no a priori knowledge as to whether it is allowed to make a data call on a given system. Even if the network indicates that it is capable of supporting packet data services, there is no guarantee that the mobile device will be allowed to make any data calls. The mobile device can only find out about such information after it makes a data call origination attempt. A mobile device can only have true data mobility if a data roaming services agreement exists between the relevant service providers. A roaming agreement between operators does not necessarily cover all available services. For example, two operators may have a voice services roaming agreement, but no packet data services roaming agreement. Currently, there is no standardized mechanism to convey this information to the mobile device. As a result, the mobile device is forced to make blind data call origination attempts to find out whether it is allowed to make data calls or not. This has a significant impact on the battery life, especially in a geographical area where the mobile device goes in and out of a system where data calls are not allowed. Therefore, there is a need for a device capable of efficiently handling interactions with a network with respect to data service availability.

SUMMARY OF THE INVENTION

It is an object of the present invention to obviate or mitigate at least one disadvantage of previous service discovery arrangements. It is particularly advantageous to provide an improvement with respect to the discovery of data services for mobile devices.

According to an aspect of the invention, there is provided a mobile device capable of supporting packet data services offered by wireless networks. The mobile device includes a memory, as well as a transceiver for exchanging packet data service authentication information with the wireless networks. The mobile device also includes a current blacklist provided in the memory, the current blacklist identifying wireless networks that do not provide packet data services to the mobile device, the current blacklist being based on previous packet data service authentication rejections. The mobile device further includes a processor for updating the current blacklist in response to newly received packet data service authentication information.

According to another aspect of the invention, there is provided a method of data service discovery for a mobile device having a current blacklist. The method includes the following steps: detecting a wireless network; examining the current blacklist stored on the mobile device; if the detected wireless network is listed in the current blacklist, refraining from making any packet data call attempts for a predetermined period of time. Otherwise, the method includes the following steps: determining whether the wireless network provides packet data services to the mobile device, and adding the wireless network to the current blacklist if the wireless network does not provide packet data services to the mobile device.

According to a further aspect of the invention, there is provided a method of packet data service notification in a wireless network, the wireless network including a server and a mobile device. The method includes the following steps: receiving at the server a registration of a newly powered-up mobile device; retrieving a server-stored current blacklist identifying wireless networks that do not provide packet data services to the newly powered-up mobile device; and sending the server-stored current blacklist from the server to the newly powered-up mobile device for reception by and storage on the mobile device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein:

FIG. 2 illustrates a simplified representation of a conventional preferred roaming list;

FIG. 3 illustrates a system used for authentication in a simple IP network;

DETAILED DESCRIPTION

Figure 1:
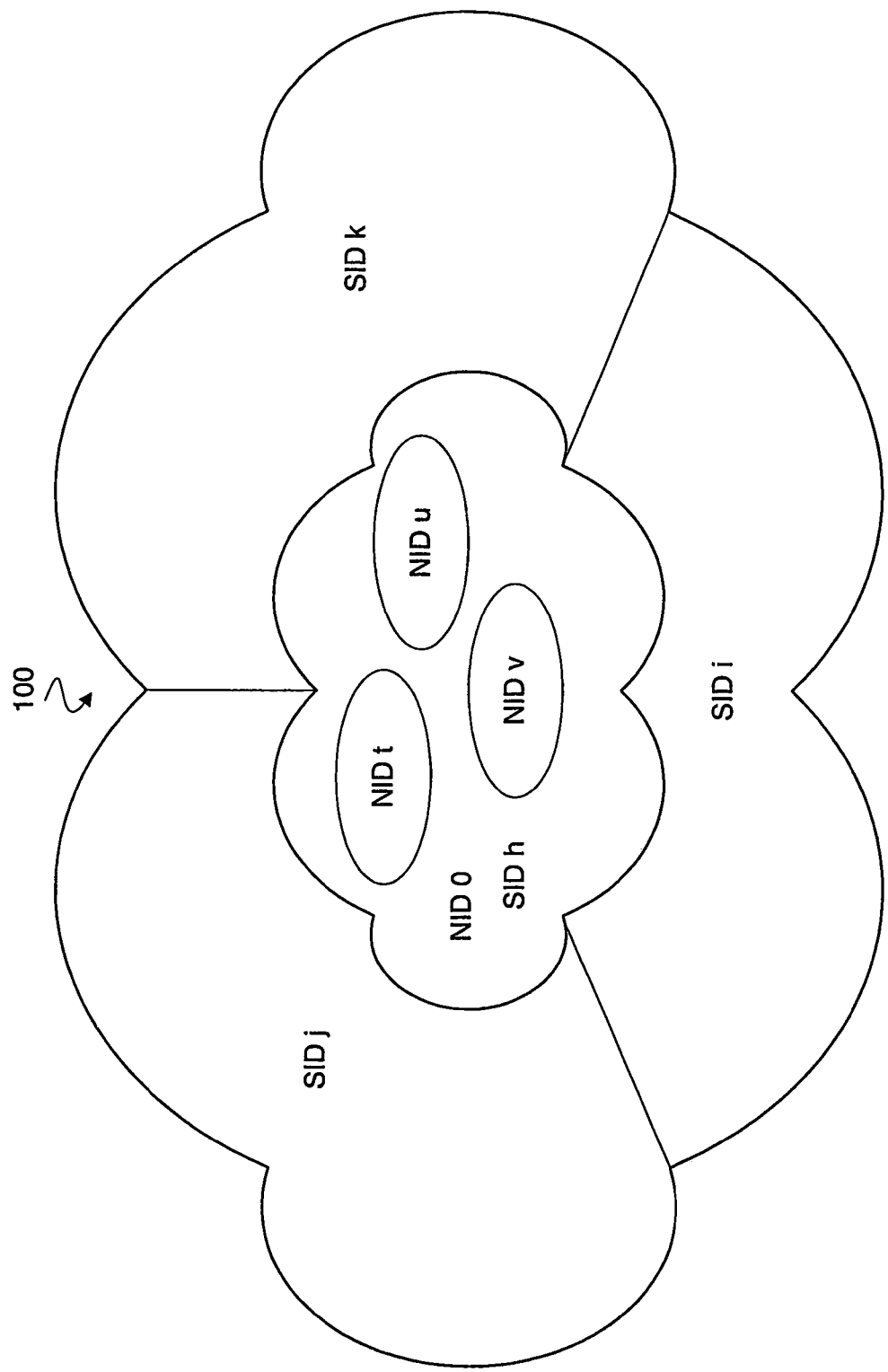
FIG. 1 illustrates a network cloud showing the relationship between various system identifiers and network identifiers.

Generally, the present invention provides a method and apparatus for packet data service discovery without any a priori knowledge. A current blacklist comprising entries for wireless networks not providing packet data services is kept in a mobile device's memory, in order to avoid unnecessary repeated requests to such networks. Current preferred roaming lists can identify whether a given wireless network can be acquired, but do not identify whether a data services roaming agreement exists. A mobile device, or mobile station, according to the invention, or employing a method according to the invention, dynamically "auto-discovers" the wireless networks on which it is permitted to make packet data calls. A list of wireless networks not providing packet data services (i.e. either not supporting the services or not having a packet data services roaming agreement) is kept in memory of the mobile device based on previous attempts to connect to such networks.

The present invention provides at least one of the following advantages: no advance knowledge of data roaming agreements is required at the mobile device; no mobile device software change is required when a data roaming agreement changes; the mobile device can notify its home server regarding a change of status of any wireless network; significant power savings are realized at the mobile device; and unnecessary wireless network access is avoided in a network, which saves network resources and capacity.

The following paragraphs provide definitions for terms that will be used in the specification.

The term "mobile device" as used herein includes any electronic device having at least voice and data communication capabilities. The mobile device is preferably a two-way wireless communication device capable of supporting both voice services and packet data services. Although reference is made in the description to the use and provision of packet data services, the invention can advantageously be used with other types of data services. Depending on the exact functionality provided, the mobile device may be referred to in the art by different terms, for example, as a data messaging device, a two-way pager, a wireless e-mail device, a cellular telephone with data messaging capabilities, a wireless Internet appliance, or a data communication device.

The term "wireless network" as used herein includes any network or system, or the operator or carrier of such a network or system, having at least one component that provides wireless or mobile services, for example packet data services, to a mobile device.

A wireless network that "supports" packet data services has the necessary hardware and software in place to be capable of offering packet data services to a mobile device. A wireless network that "does not support" packet data services does not have the necessary hardware and software in place to be capable of offering packet data services to a mobile device.

A wireless network "provides" packet data services to a mobile device when it supports packet data services and also permits, or allows, that mobile device to use the packet data services. This permission can be, for example, pursuant to a packet data services roaming agreement between carriers, service providers, or network operators. A wireless network that "does not provide" packet data services to a mobile device either does not support packet data services, or it supports packet data services, but the mobile device is not permitted to use the packet data services, for example due to a lack of a packet data services roaming agreement.

There are two main types of CDMA packet data networks with which embodiments of the present invention can be used. The first type is a Simple IP (SIP) network in which a mobile device does not have a fixed Internet Protocol (IP) address. The IP address of a mobile device in a SIP network changes over time, with respect to location, etc. Once radio link protocol communication is established between the mobile device and a Radio Network (RN), the RN initiates an R-P interface between the RN and a Packet Data Serving Node (PDSN). The mobile device is authenticated by the serving PDSN via a RADIUS server and is subsequently assigned an IP address. The PDSN then provides the mobile device with connectivity, for instance to the Internet, an intranet (not shown), or generally an IP network. As the mobile device moves across PDSN boundaries, it is assigned new IP addresses, as necessary. An "always-on always connected" mobile device typically notifies its home server of its own IP address so that packets can be pushed to it from its own server (e.g. an enterprise server). Typically, the Home Server IP address is fixed and known to the mobile device.

The second type is a Mobile IP (MIP) network in which a mobile device can have a static IP address, which is assigned by its home wireless network. The Home Agent IP address is also programmed into the mobile device. As the mobile device roams to a foreign network and attempts to set up a data session, the Foreign Agent (which is in effect a PDSN) communicates with the mobile device's specified Home Agent and then assigns the mobile device a Care-of Address (CoA). The home IP address of a mobile device in a MIP network can remain the same regardless of location, time, etc. Other devices or servers sending data to the mobile device only need to know about its home IP address, not the CoA.

Specific examples of SIP and MIP networks will be described in further detail in relation to FIG. 3 and FIG. 4, respectively. FIG. 3 illustrates a system used for authentication in a simple IP network.

In FIG. 3, a mobile device 104 communicates with a Radio Network (RN) 106. The RN 106 performs functions such as call setup, handling handoff, performing tasks at a Radio Link Protocol (RLP) Layer and below. The RN 106 also communicates with a packet data serving node (PDSN) 108. A PDSN, used in third generation (3G) networks, has a range of IP addresses and performs IP address management, maintains a session, and may perform caching. A PDSN provides access to the Internet, intranets and Wireless Application Protocol (WAP) servers for mobile devices utilizing a RN. It provides foreign agent (FA) support in MIP networks and packet transport for virtual private networking.

Remote Authentication Dial-In User Service (RADIUS) server 110 is responsible for performing functions related to authentication, authorization, and accounting (AAA) of packet data services. It is also known as an AAA server. The RADIUS server 110 is connected to IP network 112. The PDSN 108 communicates with other network entities, such as other RADIUS servers, via the IP network 112.

The authentication steps in a SIP system such as in FIG. 3, generally comprise system access authentication and data authentication. The system access authentication is performed by a home location register/authentication center (HLR/AC) as a first level of authentication. In a system access authentication step, the RN 106 sends a global challenge, and the mobile device 104 sends a response. This step is performed before the data session is established.

Next, a data authentication step is performed. This is typically done by means of known schemes such as Challenge-Handshake Authentication Protocol (CHAP) and Password Authentication Protocol (PAP).

If there is no data roaming agreement, one of the authentication steps (typically the data authentication step) will fail. Since there is no standard definition of what to do in such a case, the mobile device keeps trying. This is relevant to an "always-on, always connected" mobile device that is expected to maintain data connectivity at all times. Furthermore, according to the CDMA standard, a "dormant" mobile device is required to reconnect an existing dormant data connection every time there is a change in the NID, SID or packet zone identifier. A "dormant" mobile device has already established a PPP context with the network, but a reconnect attempt to a new wireless network can still fail. In addition, an "always-on, always connected" mobile device may be required to notify its Home Server if there is any change in the current SID in order to facilitate proper and efficient routing of data from the Home Server to the appropriate gateway. Repeated failed attempts to setup a data session in such conditions have the effect of unnecessarily increasing the amount of network traffic, and also reduce the battery life of the mobile device. In addition, if the mobile device is on the edge of a service area, there can be a "ping-pong" effect as the device alternates between trying to authenticate on a home network and on a foreign network.

Figure 4:
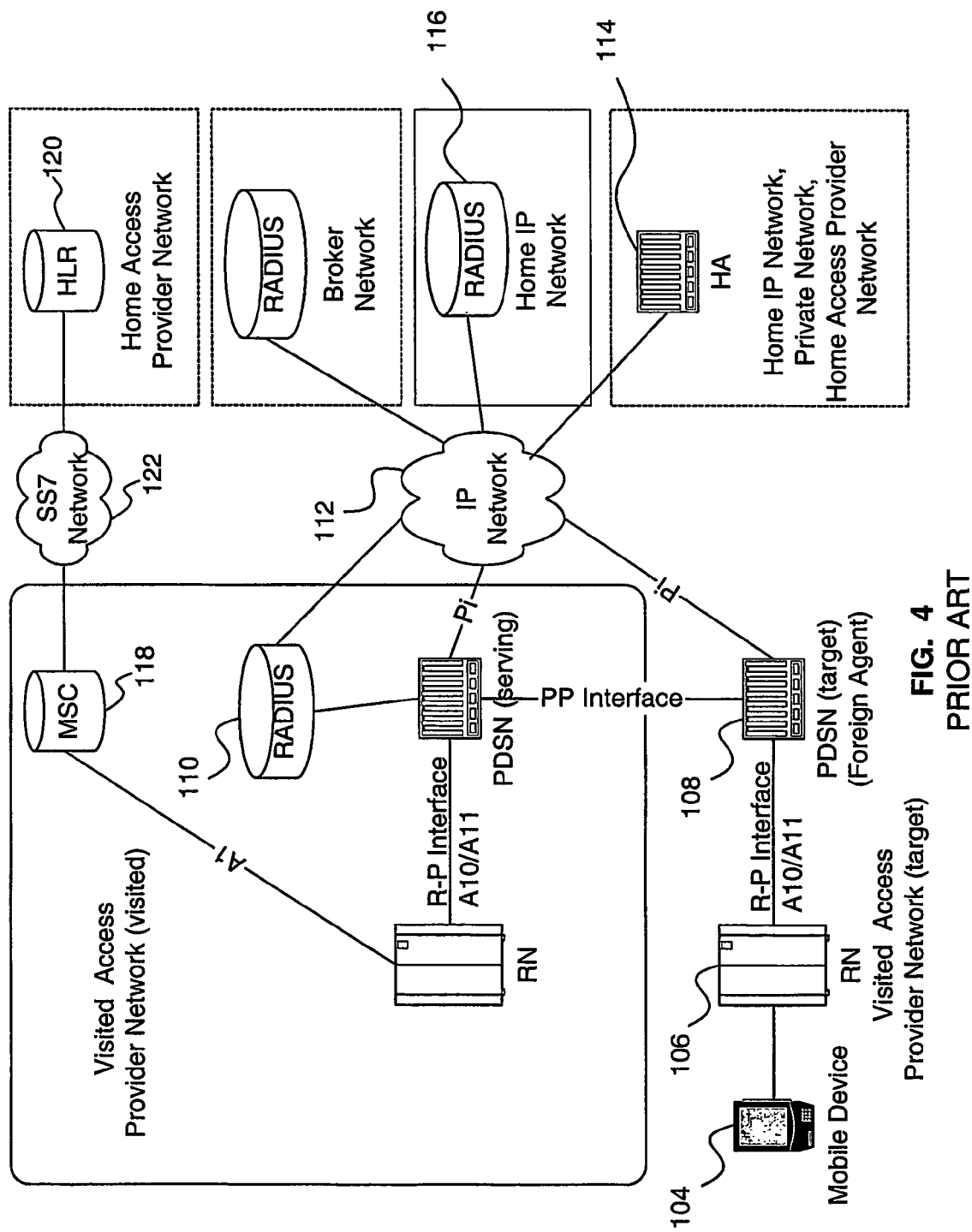
FIG. 4 illustrates a system used for authentication in a mobile IP network.

FIG. 4 illustrates a system used for authentication in a MIP network. In FIG. 4, the mobile device 104 stores a fixed home IP address, a fixed home agent address, and may store a fixed home server address. The PDSN 108 in FIG. 4 can also be referred to as the foreign agent. The foreign agent 108 communicates with a home agent 114, which has its own RADIUS server 116. Once the foreign agent 108 finds out the necessary information to communicate with the home agent 114, the authentication is actually performed at the home agent 114. The home agent 114 receives all packets intended for the mobile device 104 and forwards them on to the foreign agent 108, which in turn forwards them to the mobile device. The home agent 114 stores a CoA for the mobile device 104 and maps the home IP address of the mobile device to the CoA. In FIG. 4, the RN of the PDSN serving node can communicate via a mobile station controller (MSC) 118 to a home location register (HLR) 120 via SS7 network 122.

The authentication steps in a MIP system include an initial system access authentication step, as is the case with SIP. However, in a MIP network, the subsequent data authentication step comprises a plurality of steps, such as: a foreign agent challenge (where the foreign agent sends a message asking the mobile device to respond); an MN-AAA$_H$ authentication step; and an MN-HA authentication step, where MN represents a mobile node or mobile device, AAA$_H$ represents a home RADIUS or AAA server, and HA represents a home agent. The data authentication step can comprise one or more of these levels of authentication. If any one of these authentication steps fails, this indicates that there is no data roaming agreement.

Figure 5:
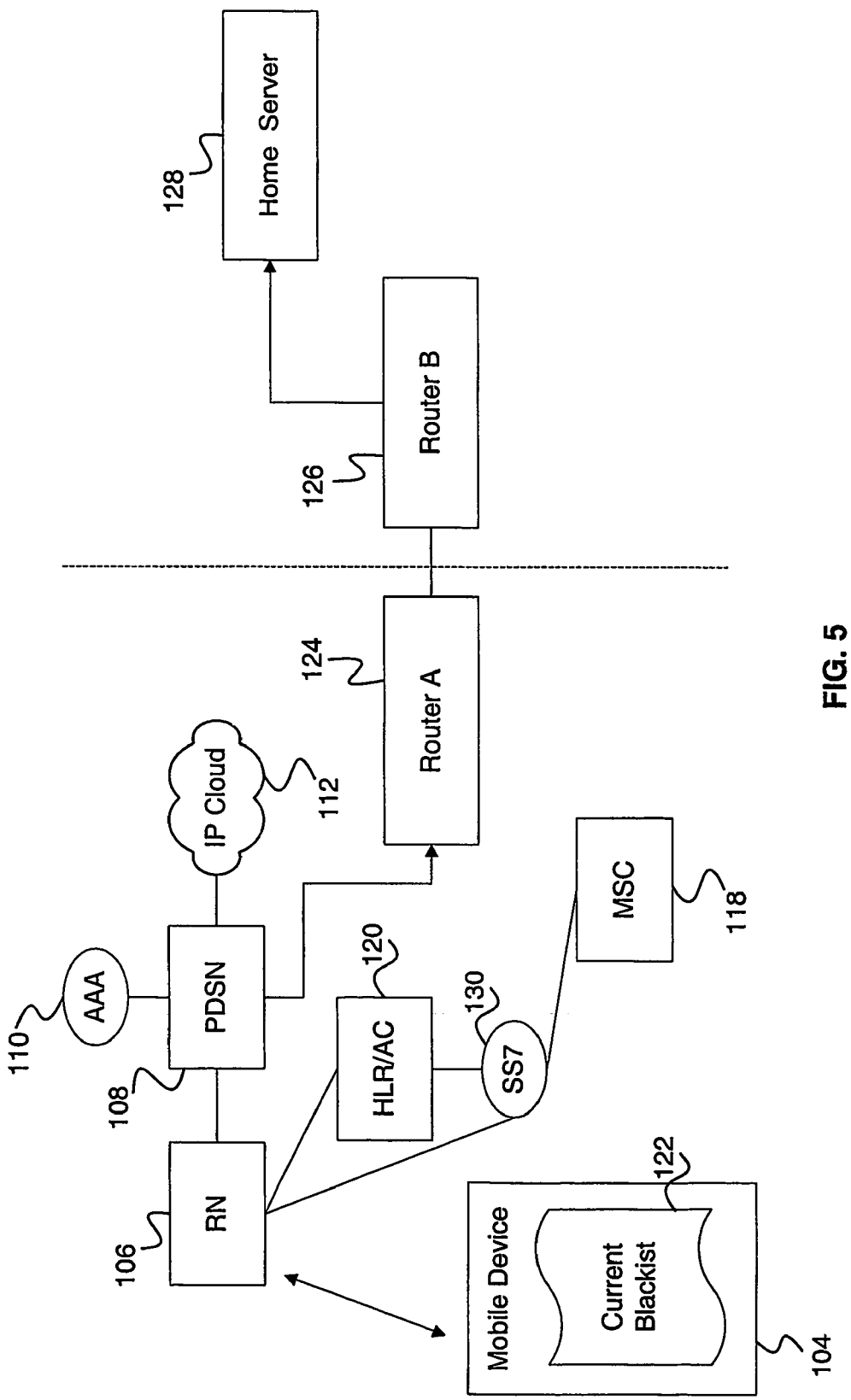
FIG. 5 illustrates a mobile device according to an embodiment of the present invention in the context of wireless network components and a home server of the mobile device.

FIG. 5 illustrates a mobile device according to an embodiment of the present invention in the context of wireless network components and a home server of the mobile device. The mobile device 104 communicates with the RN 106, which in turn can communicate with the PDSN 108, as described earlier. The PDSN 108 can communicate with a home server 128 associated with the mobile device by means of intermediary devices, such as illustrated in FIG. 5 by Router A 124 on the PDSN side and Router B 126 on the home server side.

FIG. 5 shows the mobile device having a current blacklist 122. A blacklist as used herein represents a collection of data identifying wireless networks that do not provide packet data services to the mobile device. The blacklist is preferably stored in a form in which each listed network can be uniquely identified, and will be described in further detail below. Such a blacklist is in contrast to a preferred roaming list, which is known in the art, in which a listing of systems or networks allowing voice services is typically kept. Storing and using a blacklist helps to avoid unnecessary attempts to repeatedly access data services on the same wireless network. The current blacklist 122 identifies wireless networks that do not currently provide packet data services to the mobile device and is stored in memory on the mobile device. The current blacklist 122 is based on previous data relating to packet data service availability. Such data can be obtained as follows.

The mobile device 104 typically has a processor and transceiver, which includes a transmitter and a receiver. The receiver is used to decode information frames received over the air from the wireless network. The information frames can carry higher layer protocol stack payload and may contain payload from different entities in the wireless network, such as a PDSN. The received information frames are passed to the processor, which then determines the next course of action. The transmitter is used to send over the air information frames to the wireless network as directed by the processor. The information frames carry payloads of higher layers in the protocol stack.

In terms of data authentication, the processor typically processes incoming packet data service authentication frames received from the wireless network, as well as outgoing packet data service authentication frames sent from the mobile device. The general steps relating to the exchange of such packet data service authentication frames is known in the art. For instance, an incoming packet data service authentication frame can contain a packet data service authentication request. In response to that request, the processor prepares the proper response. That response is sent by means of an outgoing packet data service authentication frame. The wireless network then performs authentication steps. Information relating to an authentication acceptance or rejection is typically sent to the mobile device. Of course, any of these exchanges can comprise, or be separated into, one or more information frames, packets or other unit of data transmission.

The exchange of packet data service authentication information between the mobile device and the wireless network is typically initiated in the context of the mobile device making a packet data call attempt on the wireless network. The authentication steps are simply a part of the data call process.

The current blacklist 122 is based on previous processed incoming packet data service authentication information. When packet data services are not provided to the mobile device, a packet data service authentication rejection is received from the wireless network. Therefore, the current blacklist is 122 is, in particular, based on received packet data service authentication rejections. The current blacklist 122 is also updated by the processor in response to newly received packet data service authentication rejections. The current blacklist 122 advantageously identifies a wireless network by its system identifier and network identifier pair, as will be described later in relation to FIG. 7.

Figure 7:
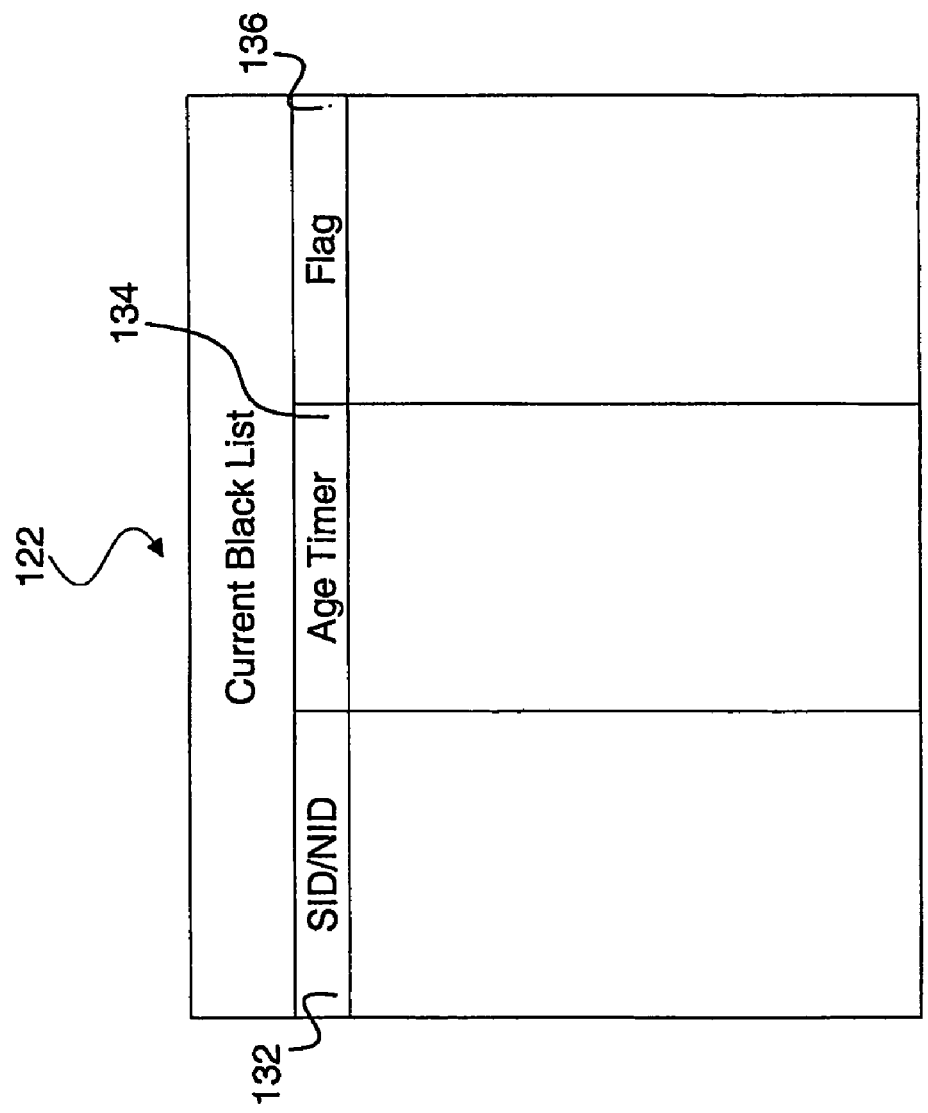
FIG. 7 illustrates a representation of an exemplary current blacklist according to an embodiment of the present invention.

In a particular embodiment, the current blacklist includes a timer value for each system that does not provide packet data services to the mobile device. The inclusion of a timer value is intended to provide an opportunity to send a subsequent packet data service authentication request at a suitable time, in order to determine if the situation has changed with respect to the wireless network not providing packet data services. The timer value can advantageously be implemented as an age timer, as is known to those skilled in the art. The selection of values to be used in the age timer 134 as shown in FIG. 7 can be based on knowledge of system parameters and the likelihood of change in such parameters. For instance, for a wireless network known to be having problems with or changes to its network equipment, the age timer can be set anywhere from a number of minutes to a number of days. For a wireless network which is the subject of negotiations to provide data roaming services, the age timer can be set anywhere from a number of days to a number of weeks or months, to monitor for any anticipated changes.

As described above, the mobile device maintains and updates its own current blacklist. This is advantageous since each mobile device can have its own particular abilities and requirements with respect to wireless networks it can acquire. The current blacklist is preferably stored in memory on the mobile device. In another embodiment, information stored in the mobile device's current blacklist can be transmitted to a server. The current blacklist can include a flag indicating whether an identification of a blacklisted wireless network has been passed to a server. Any portion of a current blacklist can advantageously be sent from the mobile device to a remote server, such as its home server, where the information can then be stored.

The server can gather current information relating to various wireless networks from a plurality of mobile devices. The server can send a server-stored current blacklist to a mobile device in particular instances where such transmission would be beneficial. For example, if a mobile device loses the information in its current blacklist, rather than building it from scratch, it could receive a server-stored current blacklist. The server-stored current blacklist can be stored in a memory of the particular server, or another server with which the server is in communications. The server can build a composite current blacklist based on reports from different mobile devices. This stored information can then be re-sent to other mobile stations.

Figure 6A:
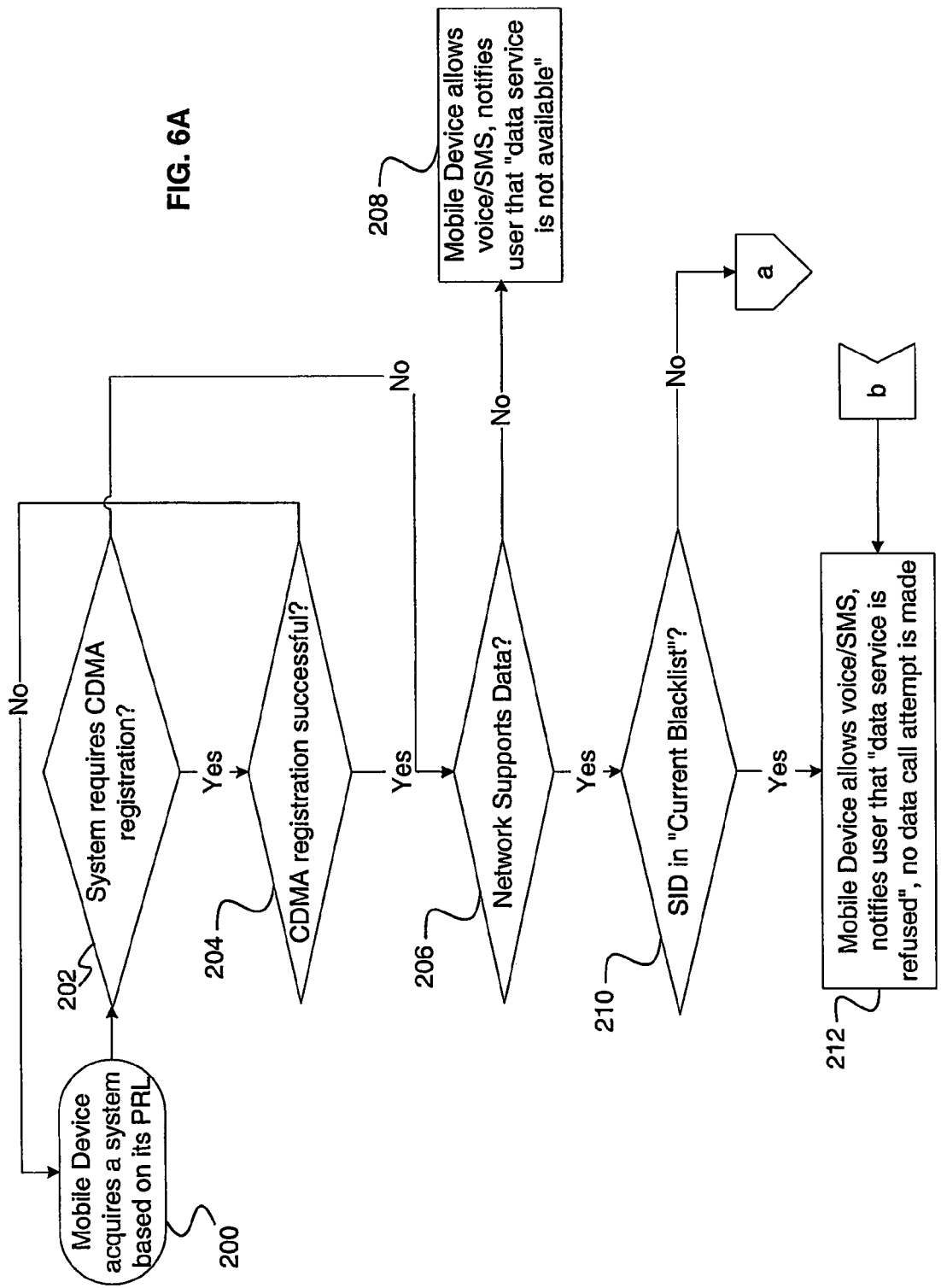
FIG. 6A and FIG. 6B illustrate a flowchart showing steps in a method according to an embodiment of the present invention.
Figure 6B:
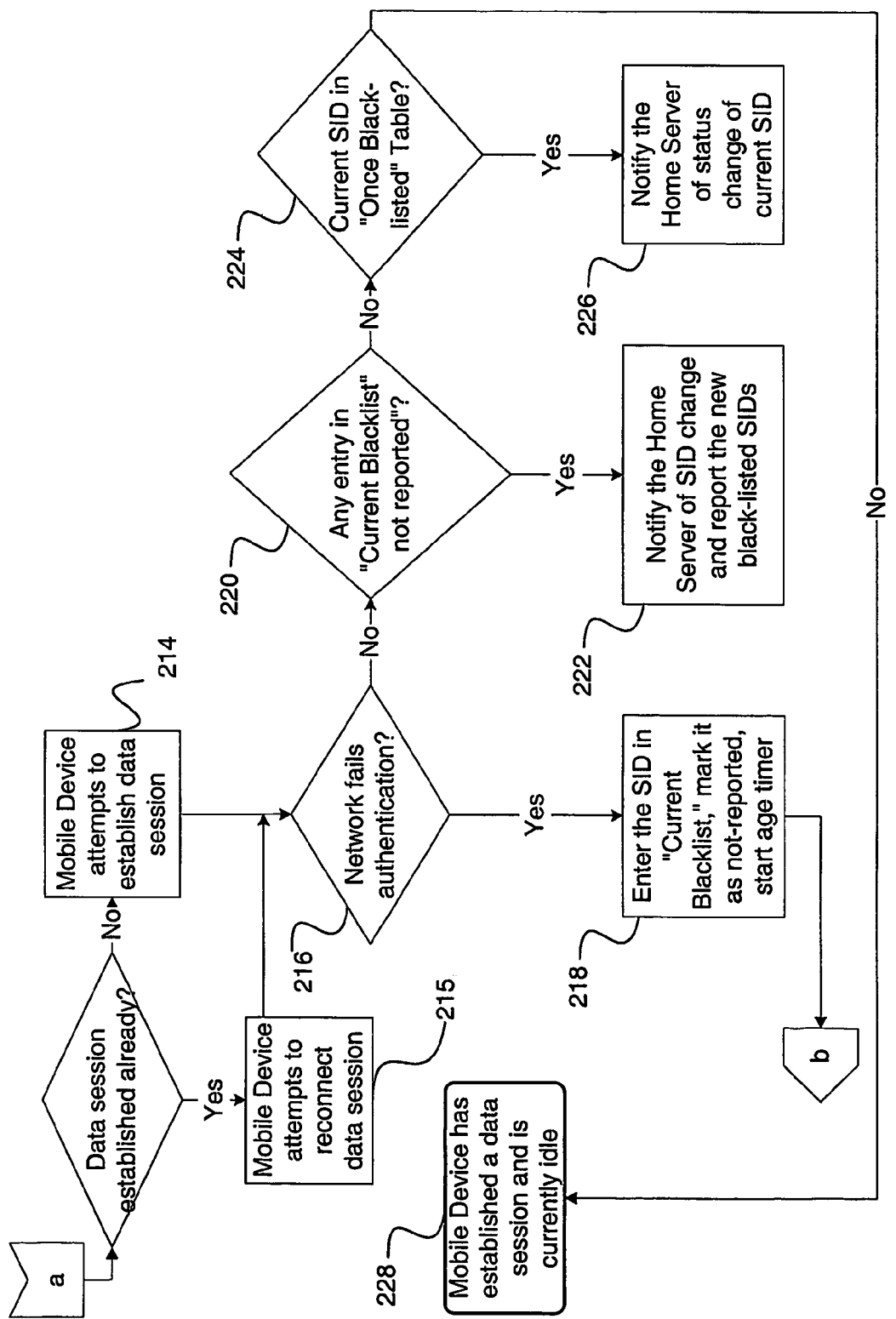

FIG. 6A and FIG. 6B illustrate a flowchart showing steps in a method according to an embodiment of the present invention. In step 200, in FIG. 6A, a mobile device starts acquisition of a system, or wireless network, based on the information in the PRL and the setting of network scan mode as specified by the user. The system acquisition can be initiated by any one of a number of situations, such as: turning the mobile device's radio functions on, change/loss of service; attempt to receive better service; network-directed redirection; rescan for a preferred system; etc.

Once a system has been acquired, it is preferably determined in step 202 whether the mobile device is required to send CDMA registration. If the system requires registration, a registration attempt is initiated. In step 204, it is determined whether the CDMA registration attempt was successful. If yes, the method continues to step 206; if not, the method returns to the first step 200 and attempts to acquire a different system. Steps 200-204 are steps that are used in known methods of data service discovery.

In step 206, it is determined whether the acquired CDMA system, or network, supports or may support packet data services. The system will typically have an indicator to convey whether packet data services are supported. An example of such an indicator is the protocol revision of the RN, e.g. protocol revision greater than or equal to 6 in a CDMA2000 network.

However, such an indicator is not an absolute guarantee that packet data services are supported since a protocol revision of 6 (IS-2000 release 0) in such a network does not necessarily mean that packet data services are supported. Further steps in the method will confirm whether packet data services are provided, or permitted, with respect to the mobile device; this step simply rules out situations where such services are definitely not supported. If the network does not support packet data service (e.g. protocol revision <6 in a CDMAOne network), then, referring to step 208, the mobile device allows only voice and SMS traffic and notifies a user that packet data services are not available. If the network indicates that it supports or may support packet data services then the method proceeds to step 210.

In step 210, a determination is made as to whether the current system, or wireless network, is in a current blacklist. This is typically done by comparing the current SID with SID values stored in the current blacklist. If the current SID is found in the current blacklist, the method proceeds to step 212 in which the mobile device allows only voice and SMS traffic and notifies a user that packet data services are not provided by the current network. No data call attempt is made in such a case.

If the current SID is not in the current blacklist, the method proceeds to step 214 in FIG. 6B (if the mobile device does not already have an active data session). This is the case when the radio is turned ON or the mobile device cannot establish a data session on previously visited systems. In this step, the mobile device attempts to establish a data call. This can be achieved by the mobile device initiating a packet data call to setup a PPP session and attempting to get an IP address. If the mobile device has already established a data session, i.e. it is in a dormant state with an IP address; the method proceeds to step 215. In step 215, the mobile device attempts to reconnect the data session. The process is similar to step 214 with minor differences.

In step 216, a determination is made as to whether the network authentication has failed, i.e. a packet data service authentication rejection is received. In a SIP network, the mobile device is authenticated by the network using CHAP or PAP, which assume that the User Id and Password of the device are known by the network. If the device turns out to be an unknown entity to the network from a packet data services viewpoint, the authentication will fail and packet data services will be refused. If authentication fails, the method proceeds to step 218 where the mobile device enters, or adds, the SID of the system to current blacklist, starts a timer and stops trying to setup a data session on the system until the timer expires. The timer value can be an age timer. Following this step, the method proceeds to step 212 in FIG. 6A, where the device allows voice and SMS and informs the user that packet data services are not provided by the network.

When the device moves to another system, it first checks whether the new system supports packet data services or not. If it does, the device then checks whether the system is in its current blacklist, as outlined in the steps above. If yes, it refrains from making any data call attempts on that system. Otherwise, the device will try to reconnect to keep the data session alive. If it fails authentication, the new system will also be blacklisted and no data retry attempts will take place until the associated age timer expires.

If, in step 216, the network successfully authenticates the mobile device, it is determined that the network provides data services to the mobile device and the method proceeds to step 220. The method also preferably includes within step 218 a step of marking the SID as "not reported". Then, in step 220, it is determined-whether any-entry in the current blacklist has not been reported. The term "reporting" here is used to represent any communication of such an entry to a device other than the mobile device, such as a home server associated with the mobile device.

Therefore, if there is a non-reported entry in the current blacklist, in step 222 the home server is notified of the SID change and any "new" blacklisted SIDs are reported. If there are no non-reported entries in the current blacklist, a preferred step 224 determines whether the current SID is stored in a "once blacklisted" table. The "once blacklisted" table is similar to the current blacklist in structure, as will be outlined below, except that it keeps a historical list of all SIDs that have been blacklisted within a particular time period. If the current SD is in the "once blacklisted" table, the method proceeds to notify the home server of a change in status of the current SID and it is removed from the "once blacklisted" list. If not, the method proceeds to step 228, where the mobile device has successfully established or reestablished a packet data session and enters a dormant state whenever it is done sending or receiving data.

In an alternative embodiment, the method further includes a step of "pushing" a current blacklist from a home server to a mobile device. This can easily be accomplished since the home server can be kept up-to-date with respect to data roaming agreements for a given wireless service provider and all the mobile devices that have subscribed to its wireless service can be informed accordingly. In some cases, this blacklist can be a composite current blacklist formed at the home server based on the reports from the mobile devices that belong to the same carrier. If the information is pushed to the mobile device, then it provides advance warning to a mobile device entering a new system. When an mobile device powers up in a RN and registers with the server, the server can also forward the information of currently blacklisted systems so that the mobile device can avoid data originations in such RNs.

FIG. 7 illustrates a representation of an exemplary current blacklist according to an embodiment of the present invention. The current blacklist 122 includes information relating to SIDs that are currently listed as the wireless networks where packet data services are not provided. The current blacklist can be stored as a table, with each entry, or row, preferably including the following data: identification of SID 132; a timer value 134, such as an age timer; and a flag 136. The SID identification can include an identification of the corresponding NID. The associated timer starts when the SID is first blacklisted and counts down until its expiry, at which time the entry is preferably removed from the current blacklist. The flag 136 indicates whether the blacklisted SID has been passed to a server, such as a home server, with allowed values preferably being YES and NO. An appropriate initial timer value can be selected, after which the SID will be removed from the blacklist, for example, one month. When a system with a formerly blacklisted SID is next encountered, the availability of packet data services is rechecked. In an alternative embodiment, the entire current blacklist can be reset or cleared when radio services on a mobile device are turned off.

There are two types of reset conditions under which a current blacklist, or a portion thereof, is cleared: a timer reset condition and a provisioning reset condition. The term "timer reset condition" is used to refer to any instance (such as expiry of an age timer, powering off of the mobile device or its radio) where an individual entry in the current blacklist is to be cleared. For example, a wireless network's entry in the current blacklist is cleared upon expiry of its age timer. After that point, the next time the mobile device encounters that wireless network, it attempts anew to acquire packet data services on the system, in case the situation has changed. A mobile device's current blacklist can alternatively be cleared when the mobile device is turned off, or when the device's radio is turned off.

The mobile device can also clear the entire current blacklist in response to a provisioning reset condition. A "provisioning reset condition" includes any change in provisioning or authentication parameters, such as user ID or password in SIP. Such a change occurs after a mobile device is provisioned for the first time, or re-provisioned with new parameters. The provisioning process can take place over the air or manually. In the case of the occurrence of a provisioning reset condition, the mobile device automatically clears the current blacklist as it may no longer be valid in light of the changed parameters.

Whenever the device re-establishes a data session after being refused service on one or more other wireless networks, it can send the list of blacklisted SIDs that has not yet been reported to the home server. In addition, the device also maintains a list of SIDs that were once blacklisted, but now provide packet data services. Once the device notifies the server of status change, the corresponding entries are cleared. When the server is notified of the status change of a wireless network and that the wireless network now provides packet data services, it can also notify other mobile devices of this status change so that all the other mobile devices can clear the entry of that wireless network and will not avoid data originations in that wireless network.

Figure 8:
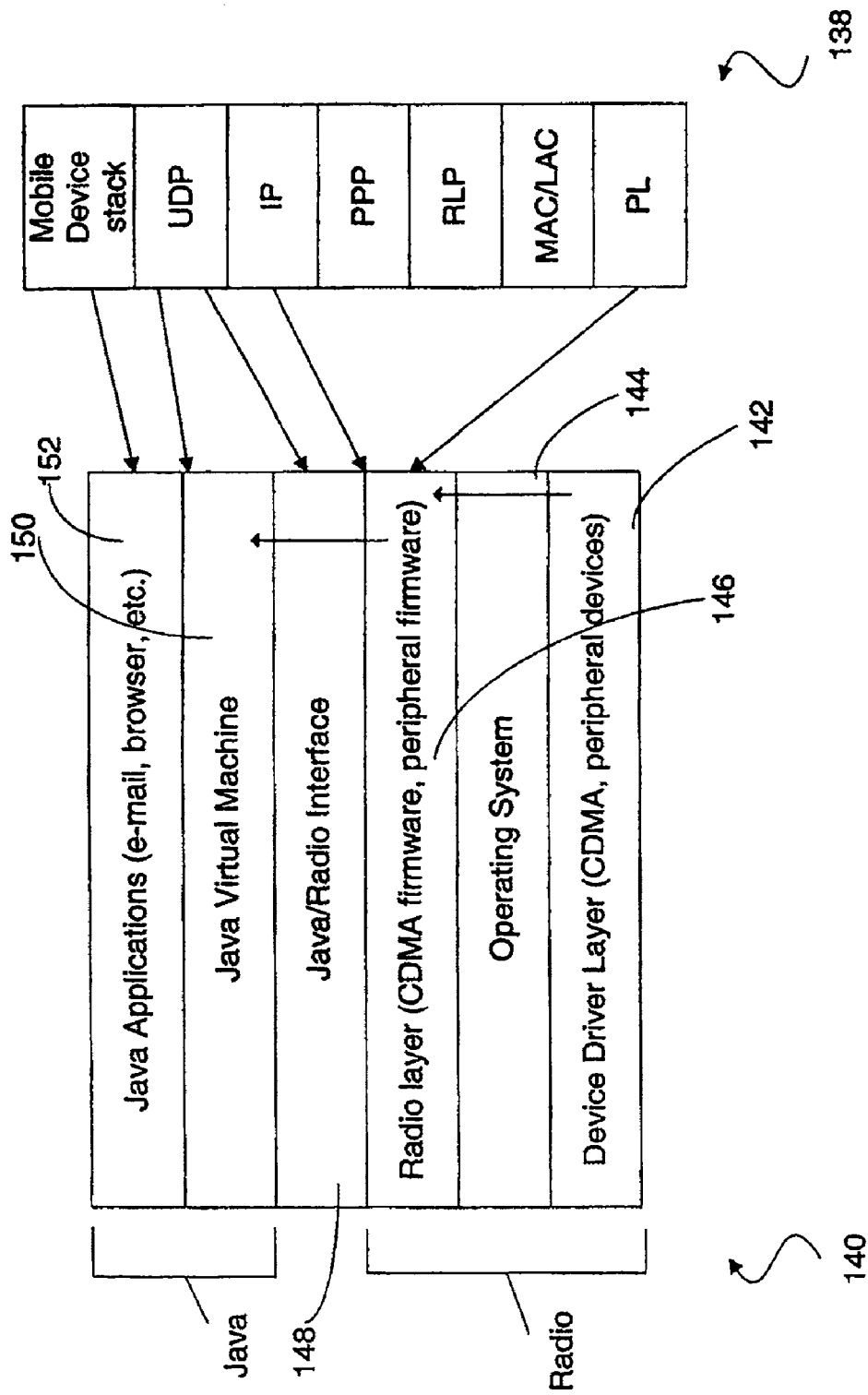
FIG. 8 illustrates the relationship between a conventional OSI network layer model and a layer model for a mobile device.

FIG. 8 illustrates the relationship between a conventional OSI network layer model 138 and a similar layer model 140 for a typical mobile device. A device driver layer 142, an operating system layer 144 and a radio layer 146 can collectively be referred to as a radio section. The Java/Radio Interface 148 facilitates communication between the layers in the radio section and those in the Java section. Although the applications in this example are shown as Java-based, they can be based on any other high level language. The Java section includes a Java Virtual Machine layer 150 and a Java Applications layer 152. The steps shown in FIG. 6 are preferably performed at the layers identified as the radio section, although they may alternatively be performed at the layers identified as a Java section.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A mobile device capable of supporting packet data services and voice services offered by wireless networks, the mobile device comprising:
   a transceiver for exchanging packet data service authentication information with the wireless networks;
   a memory;

a packet data services blacklist provided in the memory, the packet data services blacklist identifying wireless networks that do not provide packet data services to the mobile device, the packet data services blacklist being based on previous packet data service authentication rejections and being distinct from a voice services blacklist, the packet data services blacklist including a flag indicating whether an identification of a wireless network blacklisted in relation to the mobile device has been communicated to another device; and a processor for updating the packet data services blacklist in response to newly received packet data service authentication information.

2. The mobile device of claim 1 wherein the packet data services blacklist includes an element selected from the group consisting of: a system identifier and network identifier for each wireless network not providing packet data services to the mobile device; a timer value for each wireless network not providing packet data services to the mobile device; and an age timer for each wireless network not providing packet data services to the mobile device.

3. The mobile device of claim 1 wherein the packet data services blacklist includes a composite packet data services blacklist received from a server.

4. The mobile device of claim 1 wherein the processor:
prepares a notification to a server if the mobile device finds a wireless network which was not previously providing packet data services to the mobile device and is now providing packet data services to the mobile device; and
processes a notification received from a server to other mobile devices to clear the entry of a wireless network which was previously not providing packet data services but currently is providing packet data services.

5. The mobile device of claim 1 wherein the other device comprises a server.

6. The mobile device of claim 1 further comprising a historical blacklist provided in the memory, distinct from the packet data services blacklist and the voice services blacklist, the historical blacklist identifying wireless networks that are no longer in the packet data services blacklist and were once in the packet data services blacklist within a particular time period.

7. A method of data service discovery for a mobile device having a packet data services blacklist comprising:
detecting a wireless network;
examining the packet data services blacklist stored on the mobile device, the packet data services blacklist being distinct from a voice services blacklist;
if the detected wireless network is listed in the packet data services blacklist, refraining from making any packet data call attempts for a predetermined period of time;
otherwise, determining whether the wireless network provides packet data services to the mobile device, and adding the wireless network to the packet data services blacklist if the wireless network does not provide packet data services to the mobile device;
determining whether an identification of a wireless network newly blacklisted in relation to the mobile device has been communicated to another device; and
notifying the other device of the newly blacklisted wireless network if it is determined that the identification has not been communicated to the other device.

8. The method of claim 7 further comprising, prior to the step of examining the packet data services blacklist, the step of determining whether the wireless network supports data service.

9. The method of claim 7 wherein the step of determining whether the wireless network provides packet data services to the mobile device comprises the step of authenticating the mobile device on the wireless network.

10. The method of claim 7 further comprising a step selected from the group consisting of: starting an age timer associated with a wireless network that is added to the packet data services blacklist; clearing an age timer associated with a wireless network in response to satisfaction of a reset condition; and receiving a composite packet data services blacklist from a server.

11. The method of claim 7 further comprising the step of clearing the packet data services blacklist in response to a provisioning reset condition.

12. The method of claim 7 further comprising a step selected from the group consisting of: sending a notification to a server if a mobile device finds a wireless network which was not previously providing packet data services to the mobile device and is now providing packet data services to the mobile device; and sending a notification from the server to other mobile devices to clear the entry of a wireless network which was previously not providing packet data services but currently is providing packet data services.

13. The method of claim 7 wherein the other device comprises a server.

14. The method of claim 7 further comprising:
determining whether a current system identifier is stored in a historical blacklist in response to a determination that there are no wireless networks newly blacklisted in relation to the mobile device for which an identification has not been communicated to the other device,
the historical blacklist identifying wireless networks that are no longer in the packet data services blacklist and were once in the packet data services blacklist within a particular time period, the historical blacklist being distinct from the packet data services blacklist and the voice services blacklist.

15. The method of claim 14 wherein the other device comprises a home server, and further comprising:
notifying the home server of a change in status of the current system identifier; and
removing the current system identifier from the historical blacklist.

16. A method of packet data service notification in a wireless network, the wireless network including a server and a mobile device, the method comprising:
receiving at the server a registration of a newly powered-up mobile device;
retrieving a server-stored packet data services blacklist identifying wireless networks that do not provide packet data services to the newly powered-up mobile device, the server-stored packet data services blacklist being distinct from a voice services blacklist;
updating the server-stored packet data services blacklist in response to receiving an identification of a wireless network blacklisted in relation to another mobile device; and
sending the updated server-stored packet data services blacklist from the server to the newly powered-up mobile device for reception by and storage on the mobile device.

* * * * *

UNITED STATES PATENT AND TRADEMARK OFFICE
CERTIFICATE OF CORRECTION

PATENT NO. : 7,701,872 B2
APPLICATION NO. : 10/533957
DATED : April 20, 2010
INVENTOR(S) : Muhammad Khaledul Islam and Asif Hossain It is certified that error appears in the above-identified patent and that said Letters Patent is hereby corrected as shown below:

Front Page, item (75) Inventors, delete "Khaledul M. ISLAM" and insert therefor -- Muhammad Khaledul ISLAM --.

Signed and Sealed this

Nineteenth Day of October, 2010

David J. Kappos
*Director of the United States Patent and Trademark Office*